Patented Nov. 15, 1932

1,887,678

UNITED STATES PATENT OFFICE

HENRY A. GARDNER, OF WASHINGTON, DISTRICT OF COLUMBIA

RESIN COMPOSITION SUITABLE FOR THE PRODUCTION OF FILMS

No Drawing.   Application filed February 12, 1930. Serial No. 427,951.

This invention relates to resinous compositions adapted to be combined with other materials, such as drying oils and thinners, to give film-forming compositions. The resinous compositions of my inventon are formed by incorporating, advantageously by heating or fusion, chlorinated diphenyl into known resins, both natural and artificial, such as rosin, glycerin ester resin, glycerin phthalate resin, cumaron resin and the like. By the expression "chlorinated diphenyl" I refer to a resinous body, which may range from a hard, solid mass to a soft, sticky, adhesive mass, which resinous body is produced by reacting diphenyl with chlorine, the latter in an amount sufficient to produce a chlorine-containing complex containing a relatively large amount of chlorine. The product is described in the literature (Annalen der Chemie, vol. 189, pages 138 and 145, and vol. 207, pages 339 and 342). Illustrative of such resinous bodies is the commercial product comprising diphenyl chlorinated to about 60% (i. e., containing 60% of chlorine). Since the percentage content of chlorine for a given product approximates the degree of separation of the product with chlorine, the said products are referred to either by their chlorine percentage content or percentage of separation with chlorine. The invention is illustrated by the following examples.

*Example 1.*—Glycerin phthalate, a product described by Watson Smith in 1901 in the Journal of the Society of Chemical Industry, is prepared, for instance, by heating 100 parts by weight of phthalic anhydrid with 32 parts by weight of glycerin to a temperature not higher than 190° C. To the resulting fluid mass there is added with stirring 25 parts by weight of chlorinated diphenyl which has been chlorinated to the extent of 50 to 60 percent of saturation. The product is a light colored resinous composition.

*Example 2.*—100 parts by weight of rosin are heated with 12 parts by weight of glycerin at a temperature of about 270° C. until the acid number of the product is about 20. 25 parts by weight of chlorinated diphenyl are added to the resulting glycerin ester resin and incorporated by stirring.

*Example 3.*—100 parts by weight of cumaron resin is melted and into it is stirred 25 parts by weight of chlorinated diphenyl.

*Example 4.*—75 parts by weight of a synthetic resin such as toluene sulfonamid condensed with formaldehyde are heated with 25 parts by weight of chlorinated diphenyl and 25 parts by weight of the glycerin ester of rosin. The resulting resinous composition is soluble in lacquer solvents and is compatible with nitrocellulose and other cellulose ester and ether solutions.

Rosin and other natural resins and various synthetic resins may be treated with chlorinated diphenyl in a similar manner.

The resin compositions prepared as described may be employed in the production of film-forming compositions, being particularly suitable for the production of oil varnish. For example, 100 parts by weight of the resin composition produced in accordance with Example 1 are boiled with 200 parts of tung oil until a homogeneous mixture is formed which is suitably thinned with turpentine and applied as a varnish. The resins may be combined with any of the so-called varnish oils, such as tung oil, linseed oil, etc., and thinned like known oil varnish compositions with turpentine, mineral spirits and the like and driers may be added. The resulting compositions dry with great rapidity to tough, light colored films or coatings. Apparently the chlorinated diphenyl component or perhaps some reaction product thereof in the composition has the property of causing the oil varnish films to set or harden with great speed.

Another remarkable property of the film-forming compositions made from the resin compositions of my invention is that successive coatings may be applied at short intervals, say 30 minutes, to build up a heavy coating which may then be baked and the resulting coating is capable of serving as the base for other film-forming compositions such as nitrocellulose lacquer.

Within the scope of my invention, as above described, the chlorinated diphenyl and resin may be combined in different ways and in various proportions and the chlorinated diphenyl may be chlorinated to a greater or less extent than that indicated and other materials such as pigments may be added to or incorporated into the resin compositions.

I claim:

1. A coating composition comprising a resin composition consisting essentially of a resinous material of the group consisting of rosin, glycerin ester resin, cumaron resin, and glycerin ester and aldehyde condensates, chlorinated diphenyl, and a drying oil.

2. A resin composition compatible with nitrocellulose solutions comprising toluene sulfonamid-formaldehyde resin, chlorinated diphenyl and glycerin ester rosin.

3. A coating composition comprising a mixture of chlorinated diphenyl and a resinous material of the group consisting of rosin, glycerin ester resin, cumaron resin, and glycerin ester and aldehyde condensates.

4. A coating composition comprising a mixture of chlorinated diphenyl, a drying oil, and a resinous material of the group consisting of rosin, glycerin ester resin, cumaron resin, and gylcerin ester and aldehyde condensates.

In testimony whereof, I affix my signature.

HENRY A. GARDNER.